(12) United States Patent
Saito et al.

(10) Patent No.: US 10,963,064 B2
(45) Date of Patent: Mar. 30, 2021

(54) CONTROL DEVICE AND CONTROL METHOD

(71) Applicant: HONDA MOTOR CO., LTD., Tokyo (JP)

(72) Inventors: Kota Saito, Wako (JP); Yoshihiro Matsugi, Wako (JP); Yuki Matsuura, Wako (JP); Seungho Choi, Wako (JP); Yoshikazu Matsuo, Wako (JP); Hiromi Sato, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 46 days.

(21) Appl. No.: 16/443,082

(22) Filed: Jun. 17, 2019

(65) Prior Publication Data
US 2019/0384410 A1 Dec. 19, 2019

(30) Foreign Application Priority Data

Jun. 19, 2018 (JP) .............................. JP2018-115782

(51) Int. Cl.
| | | |
|---|---|---|
| *G06K 9/00* | (2006.01) | |
| *G06F 3/01* | (2006.01) | |
| *B60W 40/08* | (2012.01) | |
| *B60W 10/30* | (2006.01) | |
| *B60W 50/00* | (2006.01) | |

(52) U.S. Cl.
CPC .............. *G06F 3/017* (2013.01); *B60W 10/30* (2013.01); *B60W 40/08* (2013.01); *G06K 9/00302* (2013.01); *G06K 9/00342* (2013.01); *G06K 9/00355* (2013.01); *B60R 2300/8006* (2013.01); *B60W 2050/0071* (2013.01)

(58) Field of Classification Search
CPC .......................... G06F 3/017; G06K 9/00302; G06K 9/00342; G06K 9/00355; B60W 40/08; B60W 10/30; B60W 2050/0071
USPC ......................................... 382/103, 100, 115
See application file for complete search history.

(56) References Cited

U.S. PATENT DOCUMENTS

| | | | | |
|---|---|---|---|---|
| 9,684,380 | B2 * | 6/2017 | Kramer | G06F 3/0425 |
| 9,864,436 | B2 * | 1/2018 | Tsukamoto | G06F 3/017 |
| 10,394,519 | B2 * | 8/2019 | Shintani | G10L 15/30 |
| 2014/0254870 | A1 * | 9/2014 | Tsukamoto | G06K 9/00355 382/103 |
| 2014/0309868 | A1 * | 10/2014 | Ricci | B60R 25/1004 701/36 |
| 2015/0328985 | A1 * | 11/2015 | Kim | A61B 5/163 180/272 |
| 2017/0308174 | A1 * | 10/2017 | Tsukamoto | G06F 3/017 |
| 2017/0318360 | A1 * | 11/2017 | Tran | B33Y 80/00 |
| 2018/0101354 | A1 * | 4/2018 | Shintani | G06F 3/165 |

(Continued)

FOREIGN PATENT DOCUMENTS

| | | |
|---|---|---|
| JP | 2014-174776 A | 9/2014 |
| JP | 2018-063486 A | 4/2018 |

*Primary Examiner* — Marceau Milord
(74) *Attorney, Agent, or Firm* — Carrier Blackman & Associates, P.C.; Joseph P. Carrier; Jeffrey T. Gedeon (57) ABSTRACT

A control device includes: a recognition unit that recognizes predetermined behavior of a user; an estimation unit that estimates a situation of the user on the basis of the predetermined behavior that is recognized by the recognition unit; an evaluation unit that evaluates certainty of an estimation result from the estimation unit; and an output unit that outputs to the control unit, an operation instruction in accordance with the certainty.

18 Claims, 5 Drawing Sheets

(56) References Cited

U.S. PATENT DOCUMENTS

2018/0374070 A1\* 12/2018 Bedier ................. G06Q 20/204
2019/0004614 A1\* 1/2019 Mori ....................... B60R 16/02

\* cited by examiner

FIG. 2

| BEHAVIOR INFORMATION | SITUATION INFORMATION |
|---|---|
| FORWARD BENDING POSTURE | USER HAS LOST THE WAY |
| SLIGHT AND QUICK MOTION OF HAND NEAR AIR CONDITIONER SWITCH | USER IS CONFUSED ABOUT OPERATION OF AIR CONDITIONER |
| SLIGHT AND QUICK MOTION OF HAND NEAR WIPER SWITCH | USER IS CONFUSED ABOUT OPERATION OF WIPER |

FIG. 3

| 90 Situation Information | 92 Evaluation Element Information | |
|---|---|---|
| USER HAS LOST THE WAY | USER'S LINE OF SIGHT IS DIRECTED TO ROAD | 92a |
| | USER'S HEAD OR EYES MOVE CONTINUOUSLY | |
| | USER LOOKS ANXIOUS | |
| | BRANCHING POINT IS CLOSE | |
| USER IS CONFUSED ABOUT OPERATION OF AIR CONDITIONER | USER'S LINE OF SIGHT IS DIRECTED TO AIR CONDITIONER | 92b |
| | USER TAKES ACTION EXPRESSING THAT IT IS COLD OR HOT | |
| | TEMPERATURE DIFFERENCE BETWEEN INSIDE AND OUTSIDE VEHICLE IS MORE THAN OR EQUAL TO PREDETERMINED VALUE | |
| USER IS CONFUSED ABOUT OPERATION OF WIPER | USER'S LINE OF SIGHT IS DIRECTED TO WIPER SWITCH | 92c |
| | IT IS RAINING | |
| | WIPER IS BEING STOPPED | |

| SITUATION INFORMATION | NUMBER INFORMATION | CERTAINTY INFORMATION | OPERATION INSTRUCTION INFORMATION | DEVICE INFORMATION |
|---|---|---|---|---|
| USER HAS LOST THE WAY | 4 | HIGH | DISPLAY MAP AROUND VEHICLE | NAVIGATION DEVICE |
| | 3 | MIDDLE | INQUIRE OF USER | NOTIFICATION DEVICE |
| | 2 OR LESS | LOW | NO ACTION | — |
| USER IS CONFUSED ABOUT OPERATION OF AIR CONDITIONER | 3 | HIGH | ADJUST IN-VEHICLE TEMPERATURE | AIR CONDITIONER DEVICE |
| | 2 | MIDDLE | INQUIRE OF USER | NOTIFICATION DEVICE |
| | 1 OR LESS | LOW | NO ACTION | — |
| USER IS CONFUSED ABOUT OPERATION OF WIPER | 3 | HIGH | START WIPER | WIPER DEVICE |
| | 2 | MIDDLE | INQUIRE OF USER | NOTIFICATION DEVICE |
| | 1 OR LESS | LOW | NO ACTION | — |

CONTROL DEVICE AND CONTROL METHOD

CROSS-REFERENCE TO RELATED APPLICATION

This application is based upon and claims the benefit of priority from Japanese Patent Application No. 2018-115782 filed on Jun. 19, 2018, the contents of which are incorporated herein by reference.

BACKGROUND OF THE INVENTION

Field of the Invention

The present invention relates to a control device and a control method for outputting an operation instruction to a control unit that controls a predetermined function.

Description of the Related Art

Japanese Laid-Open Patent Publication No. 2014-174776 discloses a mobile computer that starts a particular application when a system recognizes a predetermined gesture on the basis of a frame that is photographed by a camera.

SUMMARY OF THE INVENTION

A device in Japanese Laid-Open Patent Publication No. 2014-174776 is operated in accordance with the gesture performed by a user intentionally. By using this technique, the device including a predetermined function (hereinafter, referred to as controlled device) can be operated automatically in accordance with unintentional behavior of the user who is confused about something. At this time, an operation instruction corresponding to the behavior is output to a control unit of the controlled device. However, the unintentional behavior of the user does not always correspond to the situation where the user is confused about something (situation of user). Thus, if the controlled device is operated in accordance with the user's behavior, the operation that is not suitable for the situation of the user may be performed.

The present invention has been made in view of the above problem, and an object is to provide a control device and a control method for operating a controlled device appropriately in accordance with a situation of a user.

A first aspect of the present invention is a control device configured to output an operation instruction to a control unit that controls a predetermined function, the control device including: a recognition unit configured to recognize predetermined behavior of a user; an estimation unit configured to estimate a situation of the user on a basis of the predetermined behavior that is recognized by the recognition unit; an evaluation unit configured to evaluate certainty of an estimation result from the estimation unit; and an output unit configured to output to the control unit, the operation instruction in accordance with the certainty.

A second aspect of the present invention is a control method for outputting an operation instruction to a control unit that controls a predetermined function, the control method including: recognizing predetermined behavior of a user by using a recognition unit; estimating a situation of the user on a basis of the predetermined behavior that is recognized by the recognition unit by using an estimation unit; evaluating certainty of an estimation result from the estimation unit by using an evaluation unit; and outputting the operation instruction in accordance with the certainty to the control unit by using an output unit.

By the present invention, the control unit can be appropriately operated in accordance with the situation of the user.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A preferred embodiment of a control device and a control method according to the present invention is hereinafter described in detail with reference to the attached drawings.

1. Configuration of Vehicle Control System 10

A configuration of a vehicle control system 10 is described with reference to FIG. 1. The vehicle control system 10 performs control except control regarding travel of a vehicle (driving control, braking control, and steering control). Here, the vehicle control system 10 performs notification control for a user U of the vehicle, air conditioning control in the vehicle, and operation control of a wiper.

The vehicle control system 10 includes sensors 12 that acquire various pieces of information and output the various pieces of information, a control device 14 that inputs the various pieces of information, and a controlled device 16 that is a control target of the control device 14.

The sensors 12 include a camera 22, an in-vehicle temperature sensor 24, an outdoor temperature sensor 26, a rain sensor 28, and the like. The camera 22 is provided inside the vehicle, and photographs the user U in the vehicle and a hand H of the user U and outputs image information. The camera 22 may be provided so that the user U who sits in a specific seat can be photographed, or the camera 22 may be provided so that the users U who sit in seats can be photographed at the same time. The in-vehicle temperature sensor 24 detects the temperature inside the vehicle (in vehicle room) and outputs internal temperature information. The outdoor temperature sensor 26 detects the temperature outside the vehicle and outputs outside temperature information. The rain sensor 28 is provided inside a windshield, and detects rain by detecting water attached to the windshield and outputs rain information.

The control device 14 is an electronic control unit (ECU) that includes a calculation unit 30, a storage unit 40, an input/output interface (not shown), and the like. The calculation unit 30 includes a processor including a CPU and the like, and achieves various functions when the processor executes programs stored in the storage unit 40. In the present embodiment, the calculation unit 30 functions as a recognition unit 32, an estimation unit 34, an evaluation unit 36, and an output unit 38.

Figure 2:
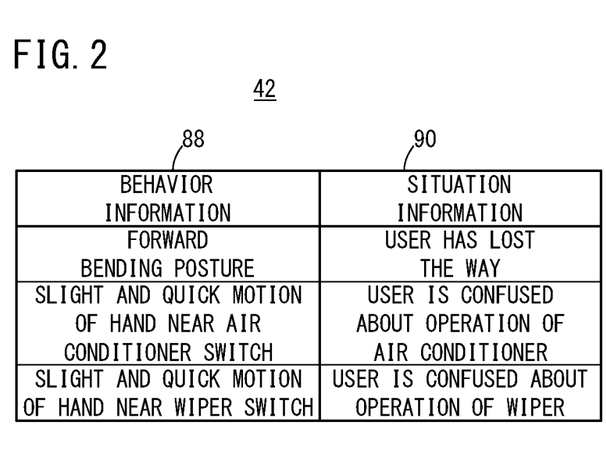
FIG. 2 is a diagram showing a situation table.
Figure 3:
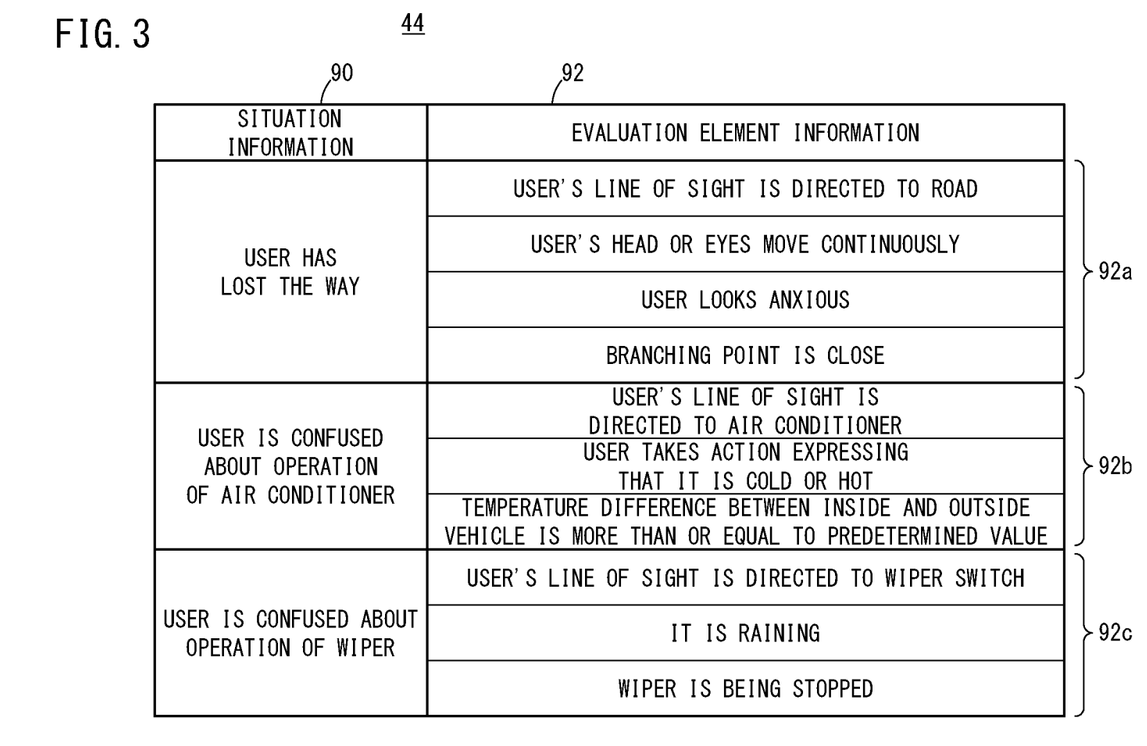
FIG. 3 is a diagram showing an evaluation element table.
Figure 4:
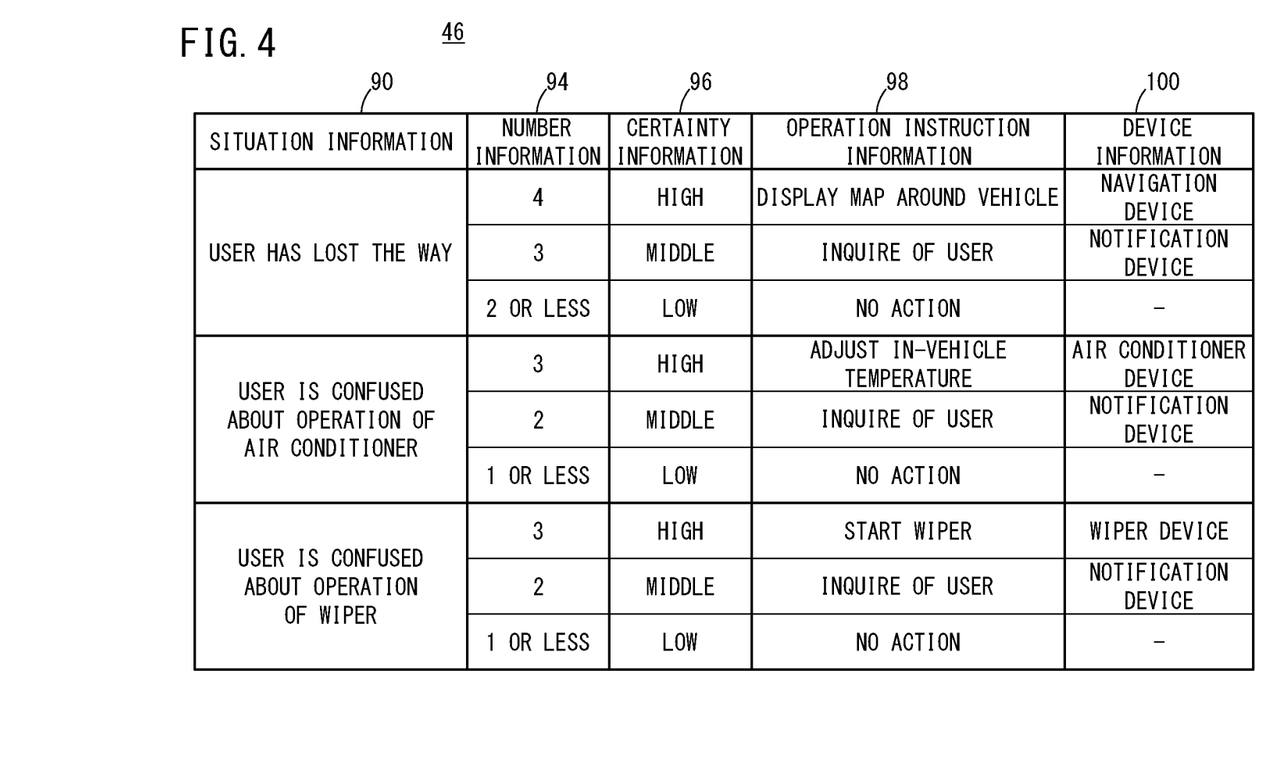
FIG. 4 is a diagram showing a device operation table.

The storage unit 40 includes a storage device such as a ROM and a RAM. The storage unit 40 stores a situation table 42, an evaluation element table 44, and a device operation table 46. As shown in FIG. 2, the situation table 42 stores behavior information 88 that expresses predetermined behavior performed by the user U and situation information 90 that expresses a situation of the user U estimated on the basis of the predetermined behavior. In the situation table 42, the behavior information 88 and the situation information 90 are associated with each other. As shown in FIG. 3, the evaluation element table 44 stores the situation information 90 and a plurality of pieces of evaluation element information 92 each expressing an evaluation element to evaluate the certainty of an estimation result. In the evaluation element table 44, the situation information 90 and the evaluation element information 92 are associated with each other. As shown in FIG. 4, the device operation table 46 stores the situation information 90, number information 94 that expresses the number of the evaluation elements matching current conditions, certainty information 96 that expresses the certainty in accordance with the number of the matching evaluation elements, operation instruction information 98 that expresses an operation instruction in accordance with the certainty, and device information 100 that expresses the controlled device 16 that corresponds to the certainty and is regarded as a target to which the operation instruction is output.

Figure 1:
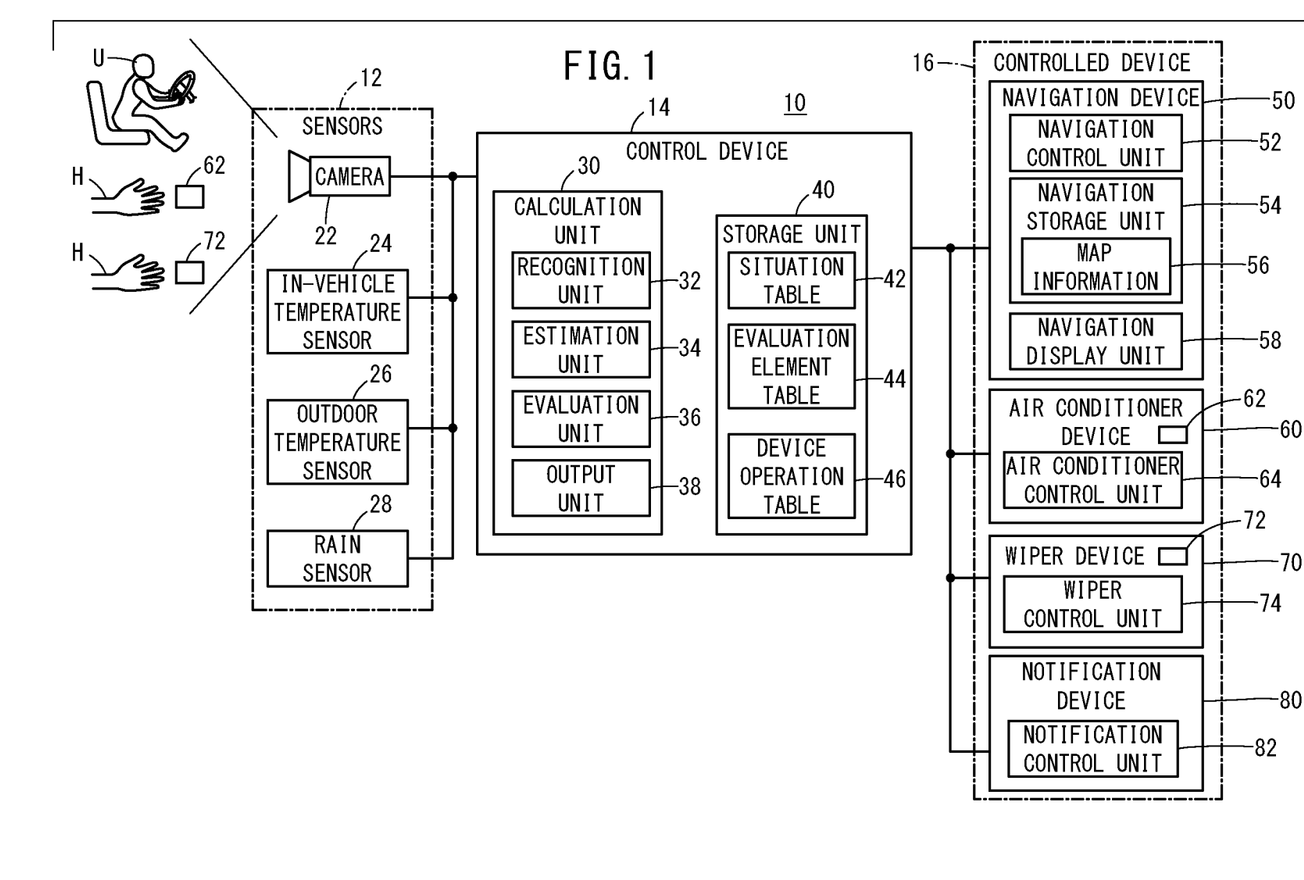
FIG. 1 is a configuration diagram of a vehicle control system including a control device according to an embodiment.

Back to FIG. 1, the description is continued. The controlled device 16 includes a navigation device 50, an air conditioner device 60, a wiper device 70, a notification device 80, and the like. Each device includes a control unit that is configured by an electronic control unit (for example, ECU). The navigation device 50 includes a navigation control unit 52 that measures the current position of the vehicle by satellite navigation and self-contained navigation and that sets a route from the current position to a destination, a navigation storage unit 54 that stores map information 56, and a navigation display unit 58 that displays the map, the route, and the like. The navigation control unit 52 includes a map display function that displays the map around the vehicle in the navigation display unit 58. The air conditioner device 60 includes a main body that sends cool or hot air in the vehicle, an air conditioner control unit 64 that controls the main body, and an air conditioner switch 62. The air conditioner control unit 64 controls a predetermined function (air conditioning function such as start, stop, and change of temperature setting) in accordance with a user U's operation of the air conditioner switch 62 or the operation instruction that is output from the control device 14. The wiper device 70 includes a wiper arm, a wiper circuit including a motor that drives the wiper arm, a wiper control unit 74 that performs energization control of the wiper circuit, and a wiper switch 72. The wiper control unit 74 controls a predetermined function (wipe function) when the user U operates the wiper switch 72. The notification device 80 includes a notification control unit 82 that controls output of visual information and audio information that are provided to the user U.

2. Operation of Vehicle Control System 10

Figure 5:
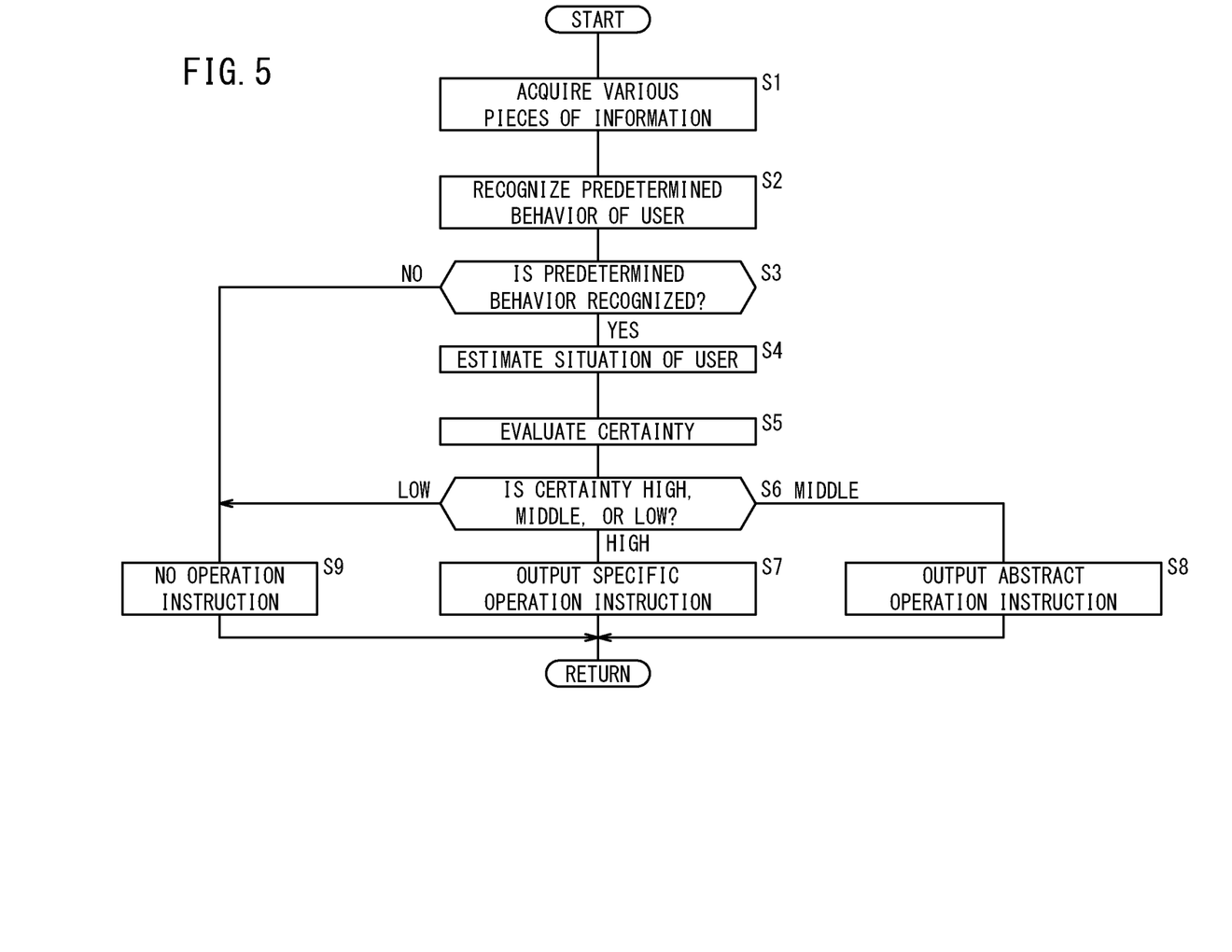
FIG. 5 is a flowchart of a process that is performed by the control device.

An operation of the control device 14 is described with reference to FIG. 5. Here, description is made of the embodiment in which the controlled device 16 is controlled on the basis of the predetermined behavior performed by the user U (driver) who sits in a driver's seat. The process in FIG. 5 is performed at predetermined time intervals.

In step S1, the control device 14 acquires the various pieces of information output by the sensors 12. In the present embodiment, the control device 14 acquires the image information of the user U that is output from the camera 22, the internal temperature information that is output from the in-vehicle temperature sensor 24, the outside temperature information that is output from the outdoor temperature sensor 26, and the rain information that is output from the rain sensor 28.

In step S2, the recognition unit 32 recognizes or determines the predetermined behavior performed by the user U by performing a well-known image recognition process with the image information. The recognition unit 32 recognizes, as the predetermined behavior, the forward bending posture of the user U, a slight and quick motion (or motions) of the hand H of the user U near the air conditioner switch 62, the slight and quick motion (or motions) of the hand H of the user U near the wiper switch 72, or the like.

For example, if the recognition unit 32 recognizes that a predetermined part of the upper half of the user U's body (head, shoulder, or the like) is ahead of a predetermined position, the recognition unit 32 recognizes that the user U is in the forward bending posture. Alternatively, if the recognition unit 32 recognizes that a predetermined part of the upper half of the user U's body is apart from a seat back by a predetermined distance or more, the recognition unit 32 recognizes that the user U is in the forward bending posture. In addition, if the recognition unit 32 recognizes that the forward bending angle of the upper half of the user U's body relative to a seat cushion is larger than or equal to a predetermined angle, the recognition unit 32 recognizes that the user U is in the forward bending posture. Note that the predetermined position, the predetermined distance, and the predetermined angle are stored in the storage unit 40 in advance.

In one example, the recognition unit 32 recognizes whether a distance x1 between the hand H of the user U and the air conditioner switch 62 is more than or equal to a first distance d1 and less than or equal to a second distance d2 ($d1 \le x1 \le d2$), and moreover, recognizes whether the hand H of the user U moves slightly and quickly. In another example, the recognition unit 32 recognizes whether a distance x2 between the hand H of the user U and the wiper switch 72 is more than or equal to the first distance d1 and less than or equal to the second distance d2 ($d1 \le x2 \le d2$), and moreover, recognizes whether the hand H of the user U moves slightly and quickly. Note that the first distance d1 and the second distance d2 are stored in the storage unit 40 in advance. In the present specification, the slight and quick motion (or motions) of the hand H will also be referred to as a confused motion (or confused motions) of the hand H. In addition to the above examples, the recognition unit 32 can recognize that the hand H of the user U makes the confused motion by using a well-known gesture recognition technique (for example, the technique in Japanese Laid-Open Patent Publication No. 2014-174776 as described above). Alternatively, if the recognition unit 32 recognizes that the hand H of the user U repeatedly makes the same motion in a predetermined range within a predetermined time, the recognition unit 32 may recognize that the hand H makes the confused motion.

If the recognition unit 32 recognizes the predetermined behavior (step S3: YES), the process advances to step S4.

On the other hand, if the recognition unit 32 does not recognize the predetermined behavior (step S3: NO), the process advances to step S9.

When the process has advanced from step S3 to step S4, the estimation unit 34 estimates the situation of the user U on the basis of the predetermined behavior that is recognized by the recognition unit 32. The estimation unit 34 reads out the situation information 90 that is associated with the behavior information 88 expressing the predetermined behavior from the situation table 42 shown in FIG. 2, and estimates the situation that is expressed by the situation information 90 as the situation of the user U.

In step S5, the evaluation unit 36 evaluates the certainty of the estimation result from the estimation unit 34. The evaluation unit 36 refers to the evaluation element information 92 that is associated with the situation information 90 that expresses the situation of the user U in the evaluation element table 44 shown in FIG. 3, and determines a matching degree between the evaluation elements that are expressed by pieces of evaluation element information 92 and the current conditions. Specifically, the evaluation unit 36 determines whether each evaluation element matches the current condition, and determines the number of the evaluation elements matching the current conditions.

For example, in step S4, it is assumed that the estimation unit 34 estimates that the user U is in a situation where "the user U has lost the way". The evaluation unit 36 determines from the evaluation element table 44, whether the evaluation elements expressed by four pieces of evaluation element information 92a associated with the situation information 90 that expresses that "the user U has lost the way" match the current conditions. In step S4, if the estimation unit 34 estimates that the user U is in a situation where "the user U is confused about the operation of the air conditioner" or a situation where "the user U is confused about the operation of the wiper", the evaluation unit 36 determines whether the evaluation elements expressed by evaluation element information 92b, 92c match the current conditions similarly.

Regarding the evaluation elements "the user U's line of sight is directed to a road", "the user U's head or eyes move continuously", and "the user U looks anxious" in the evaluation element information 92a, the evaluation unit 36 performs determination on the basis of a recognition result from the recognition unit 32. The recognition unit 32 performs the image recognition process by using the image information from the camera 22, and recognizes whether the user U's line of sight is directed to the road, or whether the user U's head or eyes move continuously. In addition, the recognition unit 32 recognizes whether the user U looks anxious by using an emotion estimation technique (for example, Japanese Laid-Open Patent Publication No. 2018-063486) using the image information from the camera 22. Regarding the evaluation element "a branching point is close", the evaluation unit 36 performs the determination on the basis of output information from the navigation device 50. Specifically, the evaluation unit 36 determines a peripheral environment of the vehicle on the basis of a result of measuring the current position of the vehicle and the map information 56. If the branching point exists within a predetermined distance from the current position of the vehicle, it is determined that the branching point is close.

Regarding the evaluation elements "the user U's line of sight is directed to the air conditioner" and "the user U takes an action expressing that it is cold or hot" in the evaluation element information 92b, the evaluation unit 36 performs the determination on the basis of the recognition result from the recognition unit 32. The recognition unit 32 performs the image recognition process by using the image information from the camera 22, and recognizes whether the user U's line of sight is directed to the air conditioner device 60. The recognition unit 32 performs the image recognition process by using the image information from the camera 22, and recognizes that the user U is rubbing his body. In this case, the evaluation unit 36 determines that the user U takes an action expressing that it is cold. In addition, the recognition unit 32 performs the image recognition process by using the image information from the camera 22, and recognizes a situation where the user U has rolled up his sleeves or a motion in which the user U fans his face with the hand H. In this case, the evaluation unit 36 determines that the user U takes an action expressing that it is hot. Regarding the evaluation element "temperature difference between inside and outside the vehicle is more than or equal to a predetermined temperature (value)", the evaluation unit 36 performs the determination on the basis of the internal temperature information that is output from the in-vehicle temperature sensor 24 and the outside temperature information that is output from the outdoor temperature sensor 26.

Regarding the evaluation element "the user U's line of sight is directed to the wiper switch 72" in the evaluation element information 92c, the evaluation unit 36 performs the determination on the basis of the recognition result from the recognition unit 32. The recognition unit 32 performs the image recognition process by using the image information from the camera 22, and recognizes whether the user U's line of sight is directed to the wiper switch 72. Regarding the evaluation element "it is raining", the evaluation unit 36 performs the determination on the basis of the rain information that is output from the rain sensor 28. Regarding the evaluation element "the wiper is being stopped", the evaluation unit 36 performs the determination on the basis of an operation signal that is output from the wiper device 70.

The evaluation unit 36 determines the matching degree described above, and counts the number of the evaluation elements matching the current conditions. The evaluation unit 36 specifies the certainty information 96 that is associated with the number information 94 that expresses the counted number by using the device operation table 46 in FIG. 4, and evaluates the certainty that is expressed by the certainty information 96 as the certainty of the estimation result from the estimation unit 34. In the device operation table 46 in the present embodiment, the certainty is divided into three stages, high, middle, and low.

In step S6, if the certainty is high (step S6: high), the process advances to step S7. If the certainty is middle (step S6: middle), the process advances to step S8. If the certainty is low (step S6: low), the process advances to step S9.

When the process has advanced from step S6 to step S7, the output unit 38 specifies the device information 100 and the operation instruction information 98 associated with the certainty information 96 that expresses "high" by using the device operation table 46, and outputs the specific operation instruction that is expressed by the operation instruction information 98 to the control unit of the controlled device 16 that is expressed by the device information 100. The specific operation refers to a direct assistance operation in accordance with the situation of the user U. More specifically, the specific operation refers to the assistance operation by the direct function (map display function by the navigation device 50, air conditioning function by the air conditioner device 60, or wipe function by the wiper device 70) that directly contributes to solving the situation of the user U (situation where the user U is confused about something). In the situation where the user U has lost the way, the specific operation corresponds to displaying the map around the vehicle by the navigation device 50. The output unit 38 outputs the operation instruction to the navigation control unit 52. Moreover, in the situation where the user U is confused about the operation of the air conditioner, the specific operation corresponds to adjusting in-vehicle temperature by the air conditioner device 60. The output unit 38 outputs the operation instruction to the air conditioner control unit 64. Furthermore, in the situation where the user U is confused about the operation of the wiper, the specific operation corresponds to starting the wiper device 70. The output unit 38 outputs the operation instruction to the wiper control unit 74. The control unit of the controlled device 16 that has received the specific operation instruction controls each function in accordance with the instruction. As described above, in step S7, the controlled device 16 whose function is controlled is the navigation device 50, the air conditioner device 60, or the wiper device 70.

When the process has advanced from step S6 to step S8, the output unit 38 specifies the device information 100 and the operation instruction information 98 associated with the certainty information 96 that expresses "middle" by using the device operation table 46, and outputs the abstract operation instruction that is expressed by the operation instruction information 98 to the control unit of the controlled device 16 that is expressed by the device information 100. The abstract operation refers to an indirect assistance operation in accordance with the situation of the user U. More specifically, the abstract operation refers to the assistance operation by controlling the other function (guide function by the notification device 80) that assists the direct function (map display function by the navigation device 50, air conditioning function by the air conditioner device 60, or wipe function by the wiper device 70) that directly contributes to solving the situation of the user U (situation where the user U is confused about something). The degree of the assistance of the abstract operation is lower than that of the specific operation. In the situation where the user U has lost the way, the abstract operation corresponds to a query to the user U from the notification device 80, for example, "have you lost your way?" Moreover, in the situation where the user U is confused about the operation of the air conditioner, the abstract operation corresponds to a query to the user U from the notification device 80, for example, "do you change in-vehicle temperature?" Furthermore, in the situation where the user U is confused about the operation of the wiper, the abstract operation corresponds to a query to the user U from the notification device 80, for example, "do you start wiper?" The controlled device 16 that has received the abstract operation instruction operates in accordance with the instruction. The output unit 38 outputs the operation instruction to the notification control unit 82. As described above, in step S8, the controlled device 16 whose function is controlled is the notification device 80.

When the process has advanced from step S3 or step S6 to step S9, the output unit 38 specifies the device information 100 and the operation instruction information 98 associated with the certainty information 96 that expresses "low" by using the device operation table 46, and outputs the operation instruction that is expressed by the operation instruction information 98 to the control unit of the controlled device 16 that is expressed by the device information 100. Note that, in the present embodiment, the output unit 38 does not output the operation instruction to any one of the controlled devices 16 in the case where the certainty is low.

3. Modifications

The situation table 42 shown in FIG. 2 may store the behavior information 88 that expresses different behavior performed when the user U is confused about something. In addition, the situation table 42 may store the situation information 90 that expresses a different situation of the user U. Moreover, the evaluation element table 44 shown in FIG. 3 may store the evaluation element information 92 that expresses a different evaluation element. Furthermore, the device operation table 46 shown in FIG. 4 may store the operation instruction information 98 that expresses a different instruction operation, or the device information 100 that expresses a different controlled device 16.

In the above embodiment, a piece of the behavior information 88 and a piece of the situation information 90 are associated with each other, but a piece of the behavior information 88 and a plurality of pieces of the situation information 90 may be associated with each other. In this case, the output unit 38 outputs to the corresponding controlled device 16, the operation instruction in accordance with the estimation result (situation of user U) whose certainty is the highest among a plurality of the estimation results (situation of user U) from the estimation unit 34.

In the above embodiment, the certainty is divided into three stages. Alternatively, the certainty may be divided into two stages, or four stages or more. In this case, similarly to the above embodiment, the lower the certainty evaluated by the evaluation unit 36 is, the more abstract operation instruction the output unit 38 outputs. Also, the higher the certainty evaluated by the evaluation unit 36 is, the more specific operation instruction the output unit 38 outputs.

The storage unit 40 may store a border of the certainty in advance, and the output unit 38 may determine whether the certainty is high or low using the border as a criterion. Moreover, if the certainty is lower than a predetermined border, the output unit 38 outputs the abstract operation instruction to the control unit (notification control unit 82) that controls the other function (guide function by the notification device 80) that assists the direct function (map display function by the navigation device 50, air conditioning function by the air conditioner device 60, or wipe function by the wiper device 70) that directly contributes to solving the situation of the user U. In addition, if the certainty is higher than the predetermined border, the output unit 38 outputs the specific operation instruction to the control unit (the navigation control unit 52, the air conditioner control unit 64, or the wiper control unit 74) that controls the direct function (map display function by the navigation device 50, air conditioning function by the air conditioner device 60, or wipe function by the wiper device 70) that directly contributes to solving the situation of the user U.

In the above embodiment, when the evaluation unit 36 evaluates the certainty, the number of the evaluation elements matching the current conditions is determined. Alternatively, each evaluation element may be associated with an individual point in advance. The evaluation unit 36 may specify the evaluation elements matching the current conditions, count the total of those points, and evaluate the total point. In this case, one or more thresholds to determine whether the certainty is high or low may be set in advance, and whether the certainty is high or low may be evaluated by comparing the certainty and the threshold(s).

4. Invention Obtained by Embodiment

The invention that can be understood by the above embodiment and the modifications is described below.

The above embodiment is the control device 14 configured to output the operation instruction to the control unit (the navigation control unit 52, the air conditioner control unit 64, the wiper control unit 74, and the notification control unit 82) that controls the predetermined function, the control device 14 including: the recognition unit 32 configured to recognize the predetermined behavior of the user U; the estimation unit 34 configured to estimate the situation of the user U on the basis of the predetermined behavior that is recognized by the recognition unit 32; the evaluation unit 36 configured to evaluate the certainty of the estimation result from the estimation unit 34; and the output unit 38 configured to output to the control unit, the operation instruction in accordance with the certainty.

By the above configuration, the certainty of the result of estimating the situation of the user U is evaluated and the operation instruction in accordance with the certainty is output to the control unit. Thus, the controlled device 16 can be appropriately operated in accordance with the situation of the user U.

The output unit 38 is configured to output to the control unit corresponding to the certainty, the operation instruction in accordance with the certainty.

By the above configuration, the operation instruction and the control unit to which the operation instruction is output are changed in accordance with the certainty. Thus, the controlled device 16 can be appropriately operated in accordance with the situation of the user U.

The lower the certainty is, the more abstract operation instruction the output unit 38 is configured to output.

If the certainty is relatively low, it is difficult to understand the situation of the user U. Thus, the abstract operation corresponding to the indirect assistance by the controlled device 16 is more useful for the user U than the specific operation corresponding to the direct assistance. By the above configuration, if the certainty is relatively low, the abstract operation instruction is output. Thus, the controlled device 16 can be appropriately operated in accordance with the situation of the user U.

The estimation unit 34 estimates that the user U is in the situation where the user U is confused about something. If the certainty is lower than the predetermined certainty, the output unit 38 is configured to output the operation instruction to the control unit, the control unit configured to control the other function that assists the direct function which directly contributes to solving the situation of the user U.

The higher the certainty is, the more specific operation instruction the output unit 38 is configured to output.

If the certainty is relatively high, it is easy to understand the situation of the user U. Thus, the specific operation corresponding to the direct assistance by the controlled device 16 is more useful for the user U than the abstract operation corresponding to the indirect assistance. By the above configuration, if the certainty is relatively high, the specific operation instruction is output. Thus, the controlled device 16 can be appropriately operated in accordance with the situation of the user U.

The estimation unit 34 estimates that the user U is in the situation where the user U is confused about something. If the certainty is higher than the predetermined certainty, the output unit 38 is configured to output the operation instruction to the control unit, the control unit configured to control the direct function which directly contributes to solving the situation of the user U.

The control device 14 includes the situation table 42 in which the behavior information 88 that expresses the predetermined behavior and the situation information 90 that expresses the situation of the user U are associated with each other, wherein if the behavior information 88 that expresses the predetermined behavior recognized by the recognition unit 32 is stored in the situation table 42, the estimation unit 34 is configured to estimate that the situation of the user U is associated with the behavior information 88 in the situation table 42.

By the above configuration, the situation table 42 prepared in advance is used. Thus, it is easy to estimate the situation of the user U.

The control device 14 includes the evaluation element table 44 in which the evaluation element information 92 that expresses the evaluation element to evaluate the certainty and the situation information 90 that expresses the situation of the user U are associated with each other, wherein the evaluation unit 36 is configured to evaluate the certainty on the basis of the matching degree between the current condition and the evaluation element.

By the above configuration, the evaluation element table 44 prepared in advance is used. Thus, it is easy to evaluate the estimation result.

The recognition unit 32 is configured to, as the predetermined behavior, recognize that the confused motion of a hand H of the user U in the vehicle, in the predetermined distance from the predetermined operation switch (the air conditioner switch 62 or the wiper switch 72) provided for the vehicle, and the output unit 38 is configured to output the operation instruction to the control unit (the air conditioner control unit 64 or the wiper control unit 74) that is operated by the operation switch.

By the above configuration, it can be recognized that the user U is confused about the operation of the controlled device 16 including the operation switch.

The control unit includes the air conditioner control unit 64 and the evaluation unit 36 is configured to evaluate the certainty on the basis of at least the temperature in the vehicle.

By the above configuration, the certainty is evaluated on the basis of the temperature in the vehicle related with the operation of the air conditioner device 60. Thus, the evaluation can be performed with high accuracy.

The control unit further includes the notification control unit 82. If the certainty is the first certainty (for example, high in FIG. 4), the output unit 38 is configured to output to the air conditioner control unit 64, the operation instruction to change the temperature in the vehicle, and if the certainty is the second certainty (for example, middle in FIG. 4) that is lower than the first certainty, the output unit 38 is configured to output to the notification control unit 82, the operation instruction to inquire of the user U whether the operation assistance for the air conditioner control unit 64 is necessary.

By the above configuration, if the certainty is relatively high, the air conditioner device 60 is operated and if the certainty is relatively low, the notification device 80 inquires of the user U. Thus, the controlled device 16 (the air conditioner device 60 or the notification device 80) can be appropriately operated.

The recognition unit 32 is configured to recognize the forward bending posture of the user U in the vehicle as the predetermined behavior, and the output unit 38 is configured to output the operation instruction regarding the route guidance to the control unit (navigation control unit 52).

By the above configuration, it can be recognized that the user U has lost the way.

The evaluation unit 36 is configured to evaluate the certainty on the basis of at least one of the change in the line of sight and the change in the face direction.

By the above configuration, the certainty is evaluated on the basis of the action performed when the user U has lost the way. Thus, the evaluation can be performed with high accuracy.

The control unit includes the navigation control unit 52 configured to display the map on the screen and the notification control unit 82. If the certainty is the first certainty (for example, high in FIG. 4), the output unit 38 is configured to output to the navigation control unit 52, the operation instruction to display the detailed map around the vehicle, and if the certainty is the second certainty (for example, middle in FIG. 4) that is lower than the first certainty, the output unit 38 is configured to output to the notification control unit 82, the operation instruction to inquire of the user U whether the route guidance is necessary.

By the above configuration, if the certainty is relatively high, the navigation device 50 displays the map, and if the certainty is relatively low, the notification device 80 inquires of the user U. Thus, the controlled device 16 (the navigation device 50 or the notification device 80) can be appropriately operated.

The above embodiment is the control method for outputting the operation instruction to the control unit that controls the predetermined function, the control method including: recognizing the predetermined behavior of the user U by using the recognition unit 32; estimating the situation of the user U on the basis of the predetermined behavior that is recognized by the recognition unit 32 by using the estimation unit 34; evaluating the certainty of the estimation result from the estimation unit 34 by using the evaluation unit 36; and outputting the operation instruction in accordance with the certainty to the control unit (the navigation control unit 52, the air conditioner control unit 64, the wiper control unit 74, or the notification control unit 82) by using the output unit 38.

By the above configuration, the certainty of the result of estimating the situation of the user U is evaluated and the operation instruction in accordance with the certainty is output to the control unit. Thus, the controlled device 16 can be appropriately operated in accordance with the situation of the user U.

Note that the control device and the control method according to the present invention are not limited to the above embodiment, and can employ various configurations without departing from the concept of the present invention.

What is claimed is:

1. A control device configured to output an operation instruction to a control unit that controls a predetermined function, the control device comprising:
   a storage unit storing an evaluation element table in which situation information expressing a situation of a user are associated with a plurality of pieces of evaluation element information each expressing an evaluation element, to evaluate a certainty of an estimation result;
   a recognition unit configured to recognize predetermined behavior of the user;
   an estimation unit configured to estimate a situation of the user on a basis of the predetermined behavior that is recognized by the recognition unit;
   an evaluation unit configured to evaluate the certainty of the estimation result from the estimation unit by referring to the evaluation element table, determining a matching degree between the evaluation elements that are expressed by the plurality of pieces of evaluation element information and current condition, and determining a number of the evaluation elements matching the current condition; and
   an output unit configured to output to the control unit, the operation instruction in accordance with the certainty.

2. The control device according to claim 1, wherein the output unit is configured to output to the control unit corresponding to the certainty, the operation instruction in accordance with the certainty.

3. The control device according to claim 1, wherein the lower the certainty is, the more abstract operation instruction the output unit is configured to output.

4. The control device according to claim 1, wherein if the certainty is lower than a predetermined border, the output unit is configured to output the operation instruction to the control unit, the control unit configured to control a function that assists a direct function which directly contributes to solving the situation of the user.

5. The control device according to claim 1, wherein the higher the certainty is, the more specific operation instruction the output unit is configured to output.

6. The control device according to claim 1, wherein if the certainty is higher than a predetermined border, the output unit is configured to output the operation instruction to the control unit, the control unit configured to control a direct function which directly contributes to solving the situation of the user.

7. The control device according to claim 1, further comprising a situation table in which behavior information that expresses the predetermined behavior and situation information that expresses the situation of the user are associated with each other,
   wherein if the behavior information that expresses the predetermined behavior recognized by the recognition unit is stored in the situation table, the estimation unit is configured to estimate that the situation of the user is associated with the behavior information in the situation table.

8. The control device according to claim 1, wherein:
   the recognition unit is configured to, as the predetermined behavior, recognize a confused motion of a hand of the user in a vehicle, in a predetermined distance from a predetermined operation switch provided for the vehicle; and
   the output unit is configured to output the operation instruction to the control unit that is operated by the operation switch.

9. The control device according to claim 8, wherein:
   the control unit includes an air conditioner control unit; and
   the evaluation unit is configured to evaluate the certainty on a basis of at least temperature in the vehicle.

10. The control device according to claim 9, wherein:
    the control unit further includes a notification control unit;
    if the certainty is first certainty, the output unit is configured to output to the air conditioner control unit, the operation instruction to change the temperature in the vehicle; and
    if the certainty is second certainty that is lower than the first certainty, the output unit is configured to output to the notification control unit, the operation instruction to inquire of the user whether operation assistance for the air conditioner control unit is necessary.

11. The control device according to claim 1, wherein:
    the recognition unit is configured to recognize a forward bending posture of the user in the vehicle as the predetermined behavior; and
    the output unit is configured to output the operation instruction regarding route guidance to the control unit.

12. The control device according to claim 11, wherein the evaluation unit is configured to evaluate the certainty on a basis of at least one of a change in line of sight and a change in a face direction.

13. The control device according to claim 12, wherein:
the control unit includes a navigation control unit configured to display a map on a screen and a notification control unit;
if the certainty is first certainty, the output unit is configured to output to the navigation control unit, the operation instruction to display a detailed map around the vehicle; and
if the certainty is second certainty that is lower than the first certainty, the output unit is configured to output to the notification control unit, the operation instruction to inquire of the user whether the route guidance is necessary.

14. The control device according to claim 1, wherein the storage unit includes a situation table in which behavior information that expresses predetermined behavior performed by the user and situation information that expresses the situation of the user estimated on a basis of the predetermined behavior are associated with each other,
the estimation unit reads out the situation information that is associated with the behavior information expressing the predetermined behavior from the situation table, and estimates the situation that is expressed by the situation information as the situation of the user, and
the evaluation unit refers to each of the plurality of pieces of evaluation element information that is associated with the situation information that expresses the situation of the user in the evaluation element table, and determines a matching degree between the evaluation elements that are expressed by the plurality of pieces of evaluation element information and the current condition.

15. The control device according to claim 1, wherein the current condition includes a situation in which the user is placed and a situation in which the vehicle is placed.

16. A control method for outputting an operation instruction to a control unit that controls a predetermined function, the control method comprising:
storing an evaluation element table in which situation information expressing a situation of a user are associated with a plurality of pieces of evaluation element information each expressing an evaluation element, to evaluate a certainty of an estimation result;
recognizing predetermined behavior of a user by using a recognition unit;
estimating a situation of the user on a basis of the predetermined behavior that is recognized by the recognition unit by using an estimation unit;
referring to the evaluation element table, determining a matching degree between the evaluation elements that are expressed by the plurality of pieces of evaluation element information and current condition, and determining a number of the evaluation elements matching the current condition, to evaluate the certainty of the estimation result from the estimation unit by using an evaluation unit; and
outputting the operation instruction in accordance with the certainty to the control unit by using an output unit.

17. A control device configured to output an operation instruction to a control unit that controls a predetermined function, the control device comprising:
a recognition unit configured to recognize predetermined behavior of a user;
an estimation unit configured to estimate a situation of the user on a basis of the predetermined behavior that is recognized by the recognition unit;
an evaluation unit configured to evaluate certainty of an estimation result from the estimation unit; and
an output unit configured to output to the control unit, the operation instruction in accordance with the certainty, wherein
the recognition unit is configured to, as the predetermined behavior, recognize a confused motion of a hand of the user in a vehicle, in a predetermined distance from a predetermined operation switch provided for the vehicle; and
the output unit is configured to output the operation instruction to the control unit that is operated by the operation switch,
the control unit includes an air conditioner control unit and a notification control unit,
the evaluation unit is configured to evaluate the certainty on a basis of at least temperature in the vehicle,
if the certainty is first certainty, the output unit is configured to output to the air conditioner control unit, the operation instruction to change the temperature in the vehicle, and
if the certainty is second certainty that is lower than the first certainty, the output unit is configured to output to the notification control unit, the operation instruction to inquire of the user whether operation assistance for the air conditioner control unit is necessary.

18. A control device configured to output an operation instruction to a control unit that controls a predetermined function, the control device comprising:
a recognition unit configured to recognize predetermined behavior of a user;
an estimation unit configured to estimate a situation of the user on a basis of the predetermined behavior that is recognized by the recognition unit;
an evaluation unit configured to evaluate certainty of an estimation result from the estimation unit; and
an output unit configured to output to the control unit, the operation instruction in accordance with the certainty, wherein
the recognition unit is configured to recognize a forward bending posture of the user in the vehicle as the predetermined behavior,
the output unit is configured to output the operation instruction regarding route guidance to the control unit,
the evaluation unit is configured to evaluate the certainty on a basis of at least one of a change in line of sight and a change in a face direction,
the control unit includes a navigation control unit configured to display a map on a screen and a notification control unit,
if the certainty is first certainty, the output unit is configured to output to the navigation control unit, the operation instruction to display a detailed map around the vehicle, and
if the certainty is second certainty that is lower than the first certainty, the output unit is configured to output to the notification control unit, the operation instruction to inquire of the user whether the route guidance is necessary.

* * * * *